(12) United States Patent
Vaello Paños et al.

(10) Patent No.: US 11,143,750 B2
(45) Date of Patent: Oct. 12, 2021

(54) OPTICAL CROSSTALK CALIBRATION FOR RANGING SYSTEMS

(71) Applicant: ams Sensors Singapore Pte. Ltd., Singapore (SG)

(72) Inventors: Miguel Bruno Vaello Paños, Zurich (CH); Javier Miguel Sánchez, Zurich (CH); Cassian Strässle, Wädenswil (CH); Liming Chen, Au (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 826 days.

(21) Appl. No.: 15/769,868

(22) PCT Filed: Oct. 24, 2016

(86) PCT No.: PCT/SG2016/050516
§ 371 (c)(1),
(2) Date: Apr. 20, 2018

(87) PCT Pub. No.: WO2017/069708
PCT Pub. Date: Apr. 27, 2017

(65) Prior Publication Data
US 2020/0064453 A1 Feb. 27, 2020

Related U.S. Application Data

(60) Provisional application No. 62/245,087, filed on Oct. 22, 2015.

(51) Int. Cl.
*G01S 7/00* (2006.01)
*G01S 7/497* (2006.01)
*G01S 17/08* (2006.01)

(52) U.S. Cl.
CPC ............. *G01S 7/497* (2013.01); *G01S 17/08* (2013.01)

(58) Field of Classification Search
USPC ....................................... 356/5.01
See application file for complete search history.

(56) References Cited

U.S. PATENT DOCUMENTS 4,891,580 A * 1/1990 Valdmanis ............. G01R 1/071
324/117 R
7,215,985 B2 * 5/2007 Petersen ............ A61B 5/14551
600/323

(Continued)

FOREIGN PATENT DOCUMENTS

CN 101051085 A 10/2007
CN 104111446 A 10/2014

(Continued)

OTHER PUBLICATIONS

ISA/AU, International Search Report for PCT/SG2016/050516 (dated Dec. 12, 2016).

(Continued)

*Primary Examiner* — James R Hulka
(74) *Attorney, Agent, or Firm* — Michael Best and Friedrich LLP

(57) ABSTRACT

The present disclosure describes calibration methods for optoelectronic modules with active illumination, such as 3D ranging systems. Calibration methods include determining cross-talk calibration parameters for an optoelectronic module having an emitting channel and a receiving channel where the optoelectronic module is operable to demodulate modulated light incident on the receiving channel. Cross-talk calibration parameters are saved to a readable storage medium and recalled during distance measurements to an object or objects in a scene.

16 Claims, 7 Drawing Sheets

(56) References Cited

U.S. PATENT DOCUMENTS

| | | | | |
|---|---|---|---|---|
| 7,865,222 B2* | 1/2011 | Weber | ................... | A61B 5/7228 |
| | | | | 600/322 |
| 8,077,294 B1* | 12/2011 | Grund | ..................... | G01N 21/65 |
| | | | | 356/4.01 |
| 8,760,631 B2* | 6/2014 | Ritter | ........................ | G01J 9/00 |
| | | | | 356/3 |
| 8,791,489 B2 | 7/2014 | Rudmann et al. | | |
| 9,613,939 B2 | 4/2017 | Rossi et al. | | |
| 9,746,557 B2* | 8/2017 | Camarri | .................. | G01S 17/08 |
| 9,966,493 B2* | 5/2018 | Rudmann | .......... | H01L 27/14627 |
| 2005/0187452 A1 | 8/2005 | Petersen et al. | | |
| 2006/0161057 A1 | 7/2006 | Weber et al. | | |
| 2009/0012387 A1* | 1/2009 | Hanson | .............. | G01R 33/3692 |
| | | | | 600/411 |
| 2011/0181861 A1* | 7/2011 | Ritter | ........................ | G01J 9/00 |
| | | | | 356/3 |
| 2013/0019461 A1 | 1/2013 | Rudmann et al. | | |
| 2013/0264586 A1* | 10/2013 | Rudmann | ............... | H01L 31/12 |
| | | | | 257/81 |
| 2014/0327900 A1* | 11/2014 | Ritter | ..................... | G01S 17/08 |
| | | | | 356/3 |
| 2015/0124241 A1* | 5/2015 | Eisele | ...................... | G01C 3/08 |
| | | | | 356/5.01 |
| 2015/0340351 A1* | 11/2015 | Rossi | .................... | H01L 25/167 |
| | | | | 257/82 |
| 2016/0025855 A1 | 1/2016 | Camarri et al. | | |

FOREIGN PATENT DOCUMENTS

| | | |
|---|---|---|
| TW | 201539012 A | 10/2015 |
| WO | 2014/042590 | 3/2014 |
| WO | 2017/069708 | 4/2017 |

OTHER PUBLICATIONS

Intellectual Property Office of Taiwan Office Action for Application No. 105134338 dated Feb. 19, 2020 (7 pages including English translation).

* cited by examiner

OPTICAL CROSSTALK CALIBRATION FOR RANGING SYSTEMS

FIELD OF THE DISCLOSURE

The present disclosure relates to methods for calibrating optoelectronic modules operable to demodulate incident modulated light.

BACKGROUND 3D ranging systems with active illumination, such as time-of-flight cameras, include optoelectronic modules with emitters and receivers. The emitters can direct modulated light onto an object or target. The receiver can collect light reflected from the object or target and produce signals. Light from the emitter and incident on the receiver without having been reflected by the object or target is direct or indirect cross-talk. Crosstalk can significantly affect the performance of the 3D ranging system. For example, distance data obtained by the 3D ranging system can be inaccurate. Typical calibration procedures for determining offset and gain are not sufficient for mitigating these inaccuracies, and can be complicated by different object or target reflectivity and distances. Consequently, calibration methods that adequately account for cross-talk are required to obtain accurate distance data.

SUMMARY

The present disclosure describes calibration methods for optoelectronic modules with active illumination, such as 3D ranging systems. In some implementations, for example, a calibration method, includes determining cross-talk calibration parameters for an optoelectronic module having an emitting channel and a receiving channel where the optoelectronic module is operable to demodulate modulated light incident on the receiving channel. This implementation further includes saving cross-talk calibration parameters to a readable storage medium (e.g., computer memory).

In some implementations, for example, the step of determining the cross-talk calibration parameters includes directing modulated light from the emitting channel to a substantially absorbing target, and sampling cross-talk-target signals generated in the receiving channel where the cross-talk-target signals correspond to incident modulated light due to cross-talk between the emitting channel and the receiving channel. This implementation further includes deriving the cross-talk calibration parameters from the cross-talk-target signals, and saving the cross-talk calibration parameters to the readable storage medium (e.g., computer memory) (e.g., computer memory).

In some implementations, for example, the step of determining the cross-talk calibration parameters includes covering the receiving channel, directing modulated light from the emitting channel, and sampling cross-talk-target signals generated in the receiving channel where the cross-talk-target signals correspond to incident modulated light due to cross-talk between the emitting channel and the receiving channel. This implementation further includes deriving the cross-talk calibration parameters from the cross-talk-target signals, and saving the cross-talk calibration parameters to the readable storage medium (e.g., computer memory).

In some implementations, for example, the calibration method further includes directing modulated light from the emitting channel to an object, and sampling object signals generated in the receiving channel where the object signals correspond to incident modulated light due to cross-talk between the emitting channel and receiving channel and due to modulated light reflected from the object. This implementation further includes deriving measured object distance parameters from the object signals, and saving the measured object distance parameters to the readable storage medium (e.g., computer memory).

In some implementations, for example, the calibration method further includes accessing the cross-talk calibration parameters from the readable storage medium (e.g., computer memory), and adjusting the measured object distance parameters with the cross-talk calibration parameters.

In some implementations, for example, the calibration method further includes determining offset parameters by directing modulated light from the emitting channel to a first partially absorbing target at a first distance, and sampling offset-target signals generated in the receiving channel wherein the offset-target signals correspond to incident modulated light due to cross-talk between the emitting channel and the receiving channel and due to modulated light reflected from the first partially absorbing target at the first distance. This implementation further includes deriving the offset parameters from the offset-target signals and the cross-talk calibration parameters and saving the offset parameters to the readable storage medium (e.g., computer memory).

In some implementations, for example, the calibration method further includes determining gain parameters by directing modulated light from the emitting channel to a second partially absorbing target at the first distance, and sampling gain-target signals generated in the receiving channel where the gain-target signals correspond to incident modulated light due to cross-talk between the emitting channel and the receiving channel and due to modulated light reflected from the second partially absorbing target at the first distance. This implementation further includes deriving the gain parameters from the gain-target signals, the offset-target signals and the cross-talk calibration parameters, and saving the gain parameters to the readable storage medium (e.g., computer memory).

In some implementations, for example, the calibration method further includes determining gain parameters by directing modulated light from the emitting channel to the first partially absorbing target at a second distance, and sampling gain-target signals generated in the receiving channel, wherein the gain-target signals correspond to incident modulated light due to cross-talk between the emitting channel and the receiving channel and due to modulated light reflected from the first partially absorbing target at the second distance. This implementation further includes deriving the gain parameters from the gain-target signals, the offset-target signals and the cross-talk calibration parameters, and saving the gain parameters to the readable storage medium (e.g., computer memory).

In some implementations, for example, the calibration method further includes determining gain parameters by directing modulated light from the emitting channel to a second partially absorbing target at a second distance, and sampling gain-target signals generated in the receiving channel where the gain-target signals correspond to incident modulated light due to cross-talk between the emitting channel and the receiving channel and due to modulated light reflected from the second partially absorbing target at the second distance. This implementation further includes deriving the gain parameters from the gain-target signals, the offset-target signals and the cross-talk calibration parameters, and saving the gain parameters to the readable storage medium (e.g., computer memory).

In some implementations, for example, the calibration method further includes deriving a linear fit calibration from the offset parameters and gain parameters.

In some implementations, for example, the calibration method further includes directing modulated light from the emitting channel to an object, and sampling object signals generated in the receiving channel where the object signals correspond to incident modulated light due to cross-talk between the emitting channel and receiving channel and due to modulated light reflected from the object. This implementation further includes deriving measured object distance parameters from the object signals.

In some implementations, for example, the calibration method further includes accessing the linear-fit calibration parameters from the readable storage medium (e.g., computer memory), and adjusting the measured object distance parameters with the linear-fit calibration parameters.

In some implementations, for example, the calibration method further includes conveying instructions to a user of the optoelectronic module via software operable to access the cross-talk calibration parameters from the readable storage medium (e.g., computer memory), operable to assess the cross-talk calibration parameters, and operable to prompt the user to direct modulated light from the emitting channel to the substantially absorbing target.

In some implementations, for example, the calibration method further includes conveying instructions to a user of the optoelectronic module via software operable to access the cross-talk calibration parameters and object distance from the readable storage medium (e.g., computer memory), operable to assess the cross-talk calibration parameters and the object distance, and operable to prompt the user to direct modulated light from the emitting channel to the object.

In some implementations, for example, the calibration method further includes conveying instructions to a user of the optoelectronic module via software operable to access the cross-talk calibration parameters and the offset parameters from the readable storage medium (e.g., computer memory), operable to assess the cross-talk calibration parameters and the offset parameters, and operable to prompt the user to direct modulated light from the emitting channel to the first partially absorbing target.

In some implementations, for example, the calibration method further includes conveying instructions to a user of the optoelectronic module via software operable to access the cross-talk calibration parameters, the offset parameters, and the gain parameters from the readable storage medium (e.g., computer memory); operable to assess the cross-talk calibration parameters, the offset parameters, and the gain parameters; and operable to prompt the user to direct modulated light from the emitting channel to the second partially absorbing target.

In some implementations, for example, the calibration method further includes conveying instructions to a user of the optoelectronic module via software operable to access the cross-talk calibration parameters, the offset parameters, and the gain parameters from the readable storage medium (e.g., computer memory); operable to assess the cross-talk calibration parameters, the offset parameters, and the gain parameters; and operable to prompt the user to direct modulated light from the emitting channel to the first partially absorbing target.

The following description describes example implementations. Various modifications can be made within the spirit of the disclosure. Accordingly, other implementations are within the scope of the claims.

DETAILED DESCRIPTION

Figure 1:
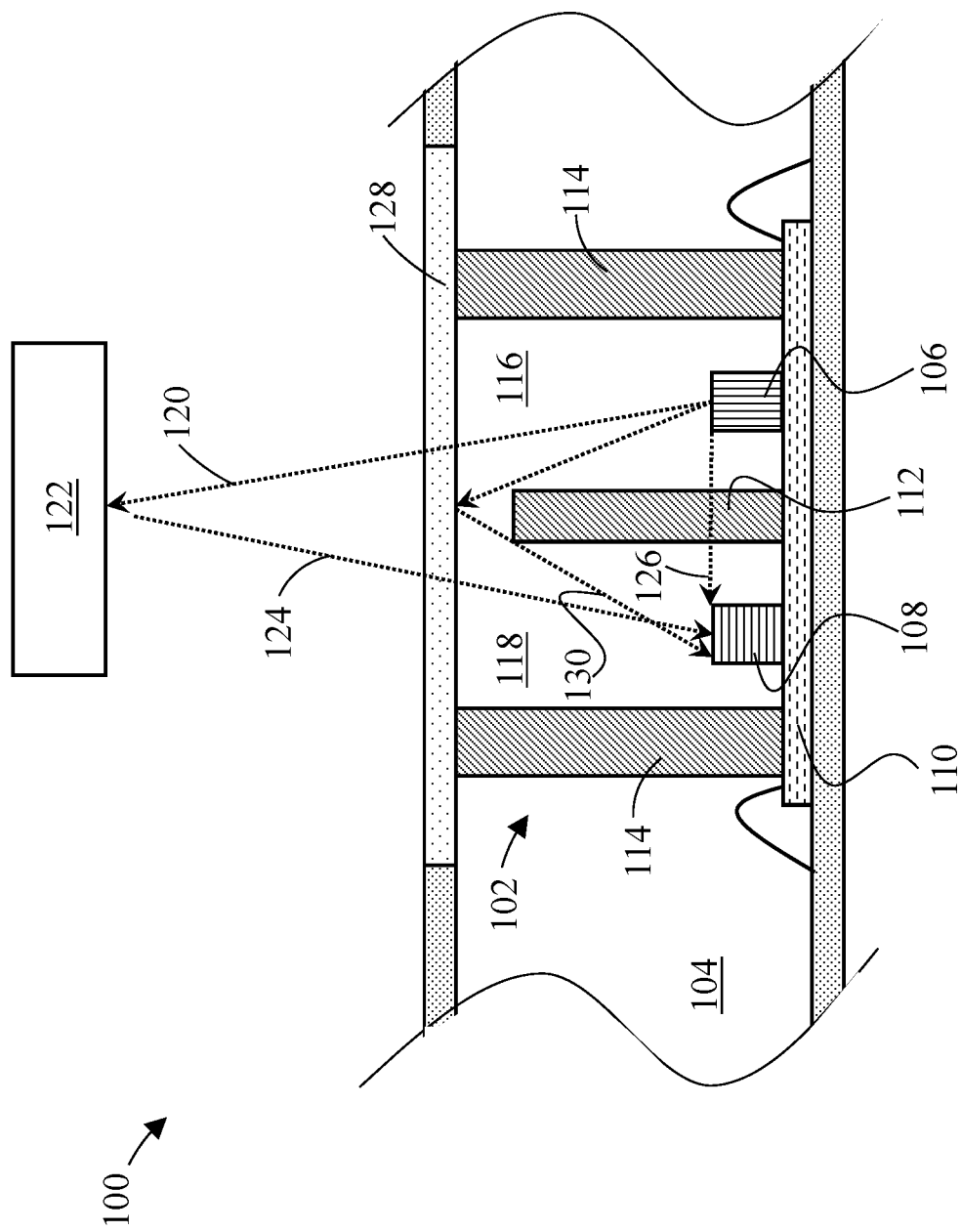
FIG. 1 depicts an example optoelectronic module operable to demodulate incident modulated light.

FIG. 1 depicts an example optoelectronic module operable to demodulate incident modulated light. A 3D ranging system 100 includes an optoelectronic module 102, a host device 104, an emitter 106, a receiver 108, and a substrate 110 (e.g., a printed circuit board). The emitter 106 and the receiver 108 can be mounted electrically to the substrate 110.

The optoelectronic module 102 further includes a non-transparent barrier 112 disposed between the emitter 106 and the receiver 108; and a housing 114 circumscribing the emitter 106, the receiver 108, and the non-transparent barrier 112. The housing 114, non-transparent barrier 112, and the emitter 106 delineate an emitting channel 116; and the housing 114, non-transparent barrier 112, and the receiver 108 delineate a receiving channel 118. The non-transparent barrier 112 provides substantial optical isolation between the emitting channel 116 and the receiving channel 118.

The emitter 106 is operable to generate emitted modulated light 120. The emitted modulated light 120 can be directed to an object 122 (e.g., objects in a scene or a target, such as a calibration target). The object 122 can exhibit a degree of absorptivity of the emitted modulated light 120 such that a portion of the emitted modulated light 120 is reflected from the object 122 thereby generating reflected modulated light 124. For example, in some instances the object 122 is substantially absorbing (e.g., 5% or even 3% reflective). In some instances, the object 122 is partially absorbing (e.g., 50% reflective or 90% reflective).

In some instances, the optoelectronic module suffers from direct cross-talk 126. Direct cross-talk 126 can occur when modulated light generated from the emitter 106 is incident on the receiver 108 directly. For example, when the non-transparent barrier 112 is not completely light tight, direct cross-talk 126 can occur.

Moreover, in instances where the optoelectronic module 102 is mounted under a partially reflective host device transparent cover 128, for example, indirect cross-talk 130 can occur. That is, in such instances indirect cross-talk 130 occurs when the modulated light generated from the emitter 106 and reflected from the transparent host device cover 128 is incident on the receiver 108. Both direct cross-talk 126 and indirect cross-talk 130 are dependent on the 3D ranging system 100 and are invariant with respect to the object 122.

In some instances, the 3D ranging system 100 can be a portable computational device (e.g., a smartphone or tablet computer). The optoelectronic module 102 can be a time-of-flight camera, proximity module, or other device operable to collect distance data via the indirect time-of-flight technique. The emitter 106 can include a light-emitting diode, a laser diode (e.g., a vertical-cavity surface-emitting laser), an array of light-emitting diodes, or an array of laser diodes. The emitter 106 can be operable to generate modulated light according to the indirect time-of-flight technique. The modulated light can be a particular wavelength or range of wavelength (e.g., infrared), and modulation frequency (e.g., 20 MHz). The modulated light can be intensity sinusoidally modulated, for example.

The 3D ranging system 100 can further include processors, microprocessor and other integrated circuits, as well as a readable storage medium (e.g., computer memory). The 3D ranging system 100 can be communicatively coupled within the computational device or communicatively coupled to a computational device operable to execute commands via software. Wherein the software can be operable to access data and convey commands to a user of the 3D ranging system 100.

The receiver 108 can include a pixel device such as a complementary metal-oxide-semiconductor device or a charge-coupled device, and can be operable to demodulate incident modulated light. Accordingly, the reflected modulated light 124, direct cross-talk 126, and indirect cross-talk 130 detected by the receiver 108 can echo the modulation characteristics of the modulated light generated by the emitter 106. However, the reflected modulated light 124, direct cross-talk 126, and indirect cross-talk 130 detected by the receiver 108 can exhibit respective phase shifts.

The phase shift exhibited by the reflected modulated light 124 can be used to determine the distance to the object 122 according to the principles of the indirect time-of-flight technique. For example, the receiver 108 can be operable to sample the optical power of the reflected modulated light 124 at four instances in time corresponding to four optical power measurements $A_0$, $A_1$, $A_2$, and $A_3$. The four instances in time can occur within a modulation period of the modulated light, and can each correspond to a 90° increment of the modulation period. The signal corresponding to the reflected light 124 can be described by an offset of (B), amplitude (A), and phase ($\phi$).

The offset of (B) describes the total intensity of the detected signal, including background light if any, and can be derived from the following:

$$B = A_0 + A_1 + A_2 + A_3 / 4$$

In some instances, the offset (B), can vary with the distance to the object 122 or the absorptivity of the object 122. For example, when the object 122 is far from the optoelectronic module 102, the light incident on the receiver 108 may be dominated by background light.

Further, the amplitude (A) of the signal can be derived from the following:

$$A = \sqrt{[A_3 - A_1]^2 + [A_0 - A_2]^2} / 2$$

And the phase ($\phi$) of the signal can be derived according to the following:

$$\varphi = \mathrm{atan}\left(\frac{A_3 - A_1}{A_0 - A_2}\right)$$

According to the principles of the indirect time-of-flight technique, the distance to the object 122 can be derived from the phase shift between the phase of the emitted modulated light 120 and the phase of the reflected modulated light 124.

The signal corresponding to the reflected modulate light 124 can be further described by a phasor within a complex coordinate system. The phase ($\phi$) of the phasor is represented by the angle of the phasor (e.g., with respect to the positive x-axis), and the amplitude (A) of the phasor is represented by the magnitude of the phasor.

Though the signal corresponding to the reflected light 124 is described by the aforementioned, the receiver 108 also detects the direct cross-talk 126 and the indirect cross-talk 128 thereby obfuscating the signal due to the light solely reflected from the object 122. Accordingly, the offset (B), amplitude (A), phase ($\phi$), phase shift, and phasor described above cannot be used to accurately determine the distance to the object 122 without first calibrating the optoelectronic module 102.

Figure 2:
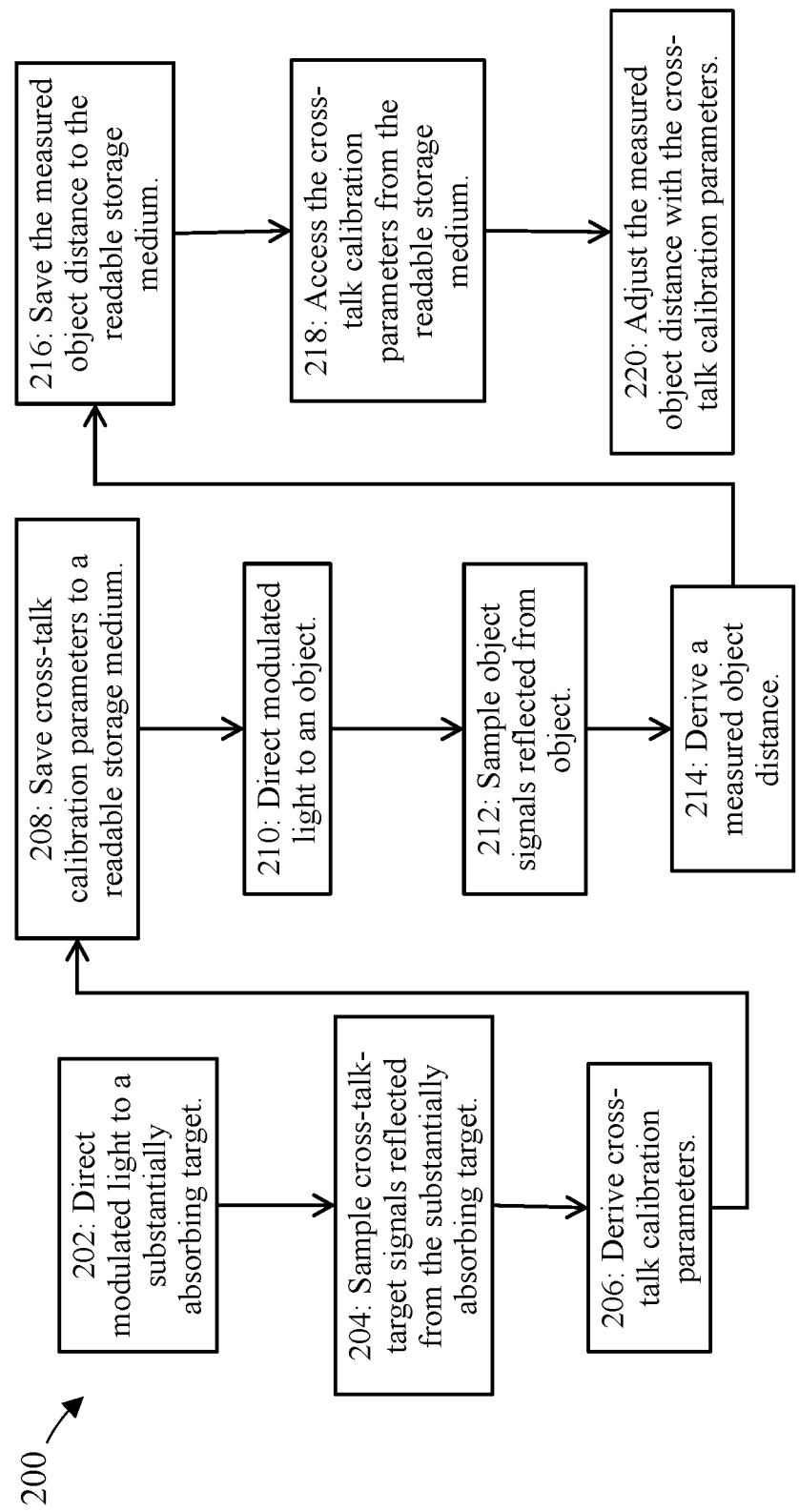
FIG. 2 depicts an example method for calibrating optoelectronic modules operable to demodulate incident modulated light.

FIG. 2 depicts an example method 200 for calibrating optoelectronic modules operable to demodulate incident modulated light such as the optoelectronic module 102 within the 3D ranging system 100. The calibration method 200 includes a step 202 of directing the emitted modulated light 120 to a substantially absorbing target such as a black card (e.g., 3% or 5% reflective). The substantially absorbing target can be disposed at a particularly large distance from the optoelectronic module 102 compared to the operation range of the optoelectronic module 102. For example, provided the operation range of the optoelectronic module 102 is 100 mm to 1500 mm, the substantially absorbing target can be disposed at 3000 mm.

The calibration method 200 includes another step 204 of sampling cross-talk-target signals via the receiver 108. The substantially absorbing target together with the particularly large distance ensures the signals received by the receiver 108 are dominated by direct cross-talk 126 and/or indirect cross-talk 130.

The calibration method 200 includes another step 206 of deriving cross-talk calibration parameters. For example, the phase ($\phi$) and amplitude (A) of the cross-talk (i.e., the direct cross-talk 126 and/or the indirect cross-talk 130) can be derived, and a phasor can be constructed within a complex coordinate system as described above.

The calibration method 200 includes another step 208 of saving the cross-talk calibration parameters; such as the phase ($\phi$), amplitude (A), offset (B), and/or the optical power measurements (e.g., $A_0$, $A_1$, $A_2$, and $A_3$); to a readable storage medium (e.g., computer memory).

The calibration method 200 includes another step 210 of directing the emitted modulated light 120 to the object 122 or objects in a scene. The object 122 is at least partially reflective to the emitted modulated light 120. For example, the object 122 can reflect at least 5% of the emitted modulated light 120 such that sufficient light is reflected to the receiver 108 to generate a useable signal. The object can be disposed at any distance within the working range of the optoelectronic module 102. For example, the object 122 can be disposed at 100 mm or 2000 mm.

The calibration method 200 includes another step 212 of sampling object signals reflected from object 122. Object signals, for example, include four optical power measurements $A_0, A_1, A_2,$ and $A_3$ as described above, sampled at four instances in time.

The calibration method 200 includes another step 214 of deriving measured object distance parameters. For example, the four optical power measurements $A_0, A_1, A_2,$ and $A_3$ referred to in step 212, can be used to derive the phase ($\phi$) and amplitude (A) of the object signal, and a phasor can be constructed within a complex coordinate system as described above. Further, as described above, distance can be derived from the principles of the indirect time-of-flight technique. The measured object distance parameters, however, include a component due to cross-talk; accordingly, the derived distance would be inaccurate.

The calibration method 200 includes another step 216 of saving the measured object distance parameters; such as the phase ($\phi$), amplitude (A), offset (B), and/or the optical power measurements (e.g., $A_0, A_1, A_2,$ and $A_3$); to the readable storage medium (e.g., computer memory).

The calibration method 200 includes another step 218 of accessing the cross-talk calibration parameters; such as the phase ($\phi$), amplitude (A), offset (B), and/or the optical power measurements (e.g., $A_0, A_1, A_2,$ and $A_3$); from the readable storage medium (e.g., computer memory).

The calibration method 200 includes another step 220 of adjusting the measured object distance parameters with the cross-talk calibration parameters. For example, the phasor representing the cross-talk parameters can be subtracted from the phasor representing the measured object distance parameters. The resulting phasor representing their difference would contain the accurate distance to the object 122.

Figure 3:
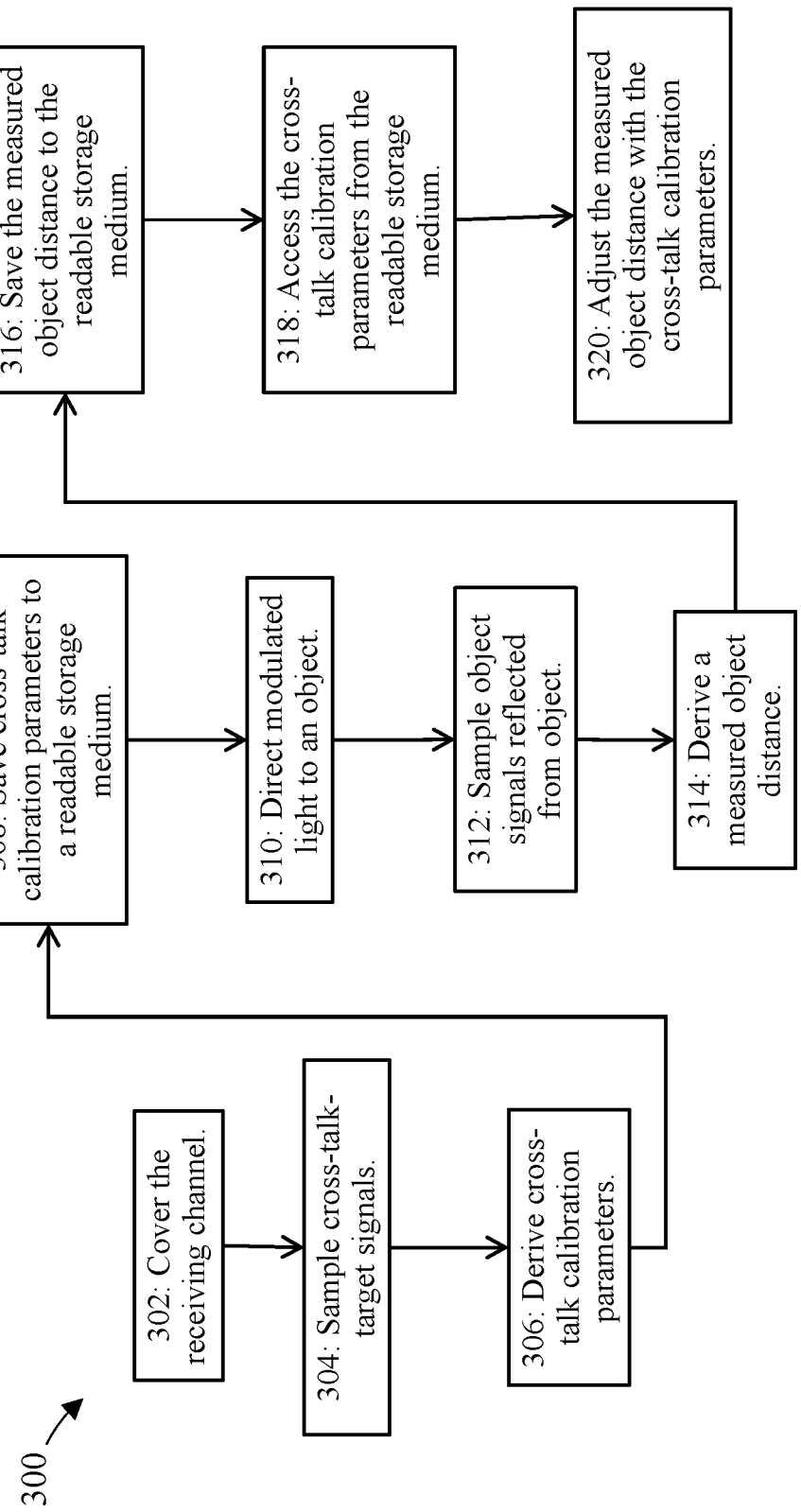
FIG. 3 depicts another example method for calibrating optoelectronic modules operable to demodulate incident modulated light.

FIG. 3 depicts another example method 300 for calibrating optoelectronic modules operable to demodulate incident modulated light. The calibration method 300 includes a step 302 of covering the receiving channel 118 such that substantially no modulated light reflected from an object, such as the object 122, is incident on the receiver 108. Accordingly, only cross-talk (i.e., direct and/or indirect cross-talk) is incident on the receiver 108.

The calibration method 300 includes another step 304 of sampling cross-talk-target signals via the receiver 108. The covered receiving channel 118 ensures the signals received by the receiver 108 are dominated by direct cross-talk 126 and/or indirect cross-talk 130.

The calibration method 300 includes another step 306 of deriving cross-talk calibration parameters. For example, the phase ($\phi$) and amplitude (A) of the cross-talk (i.e., the direct cross-talk 126 and/or the indirect cross-talk 130) can be derived, and a phasor can be constructed within a complex coordinate system as described above.

The calibration method 300 includes another step 308 of saving the cross-talk calibration parameters; such as the phase ($\phi$), amplitude (A), offset (B), and/or the optical power measurements (e.g., $A_0, A_1, A_2,$ and $A_3$); to a readable storage medium (e.g., computer memory).

The calibration method 300 includes another step 310 of directing the emitted modulated light 120 to the object 122 or objects in a scene. The object 122 is at least partially reflective to the emitted modulated light 120. For example, the object 122 can reflect at least 5% of the emitted modulated light 120 such that sufficient light is reflected to the receiver 108 to generate a useable signal. The object can be disposed at any distance within the working range of the optoelectronic module 102. For example, the object 122 can be disposed at 100 mm or 2000 mm.

The calibration method 300 includes another step 312 of sampling object signals reflected from object 122. Object signals, for example, include four optical power measurements $A_0, A_1, A_2,$ and $A_3$ as described above, sampled at four instances in time.

The calibration method 300 includes another step 314 of deriving measured object distance parameters. For example, the four optical power measurements $A_0, A_1, A_2,$ and $A_3$ referred to in step 312, can be used to derive the phase ($\phi$) and amplitude (A) of the object signal, and a phasor can be constructed within a complex coordinate system as described above. Further, as described above, distance can be derived from the principles of the indirect time-of-flight technique. The measured object distance parameters, however, include a component due to cross-talk; accordingly, the derived distance is inaccurate.

The calibration method 300 includes another step 316 of saving the measured object distance parameters; such as the phase ($\phi$), amplitude (A), offset (B), and/or the optical power measurements (e.g., $A_0, A_1, A_2,$ and $A_3$); to the readable storage medium (e.g., computer memory).

The calibration method 300 includes another step 318 of accessing the cross-talk calibration parameters; such as the phase ($\phi$), amplitude (A), offset (B), and/or the optical power measurements (e.g., $A_0, A_1, A_2,$ and $A_3$); from the readable storage medium (e.g., computer memory).

The calibration method 300 includes another step 320 of adjusting the measured object distance parameters with the cross-talk calibration parameters. For example, the phasor representing the cross-talk parameters can be subtracted from the phasor representing the measured object distance parameters. The resulting phasor representing their difference would contain the accurate distance to the object 122.

Figure 4:
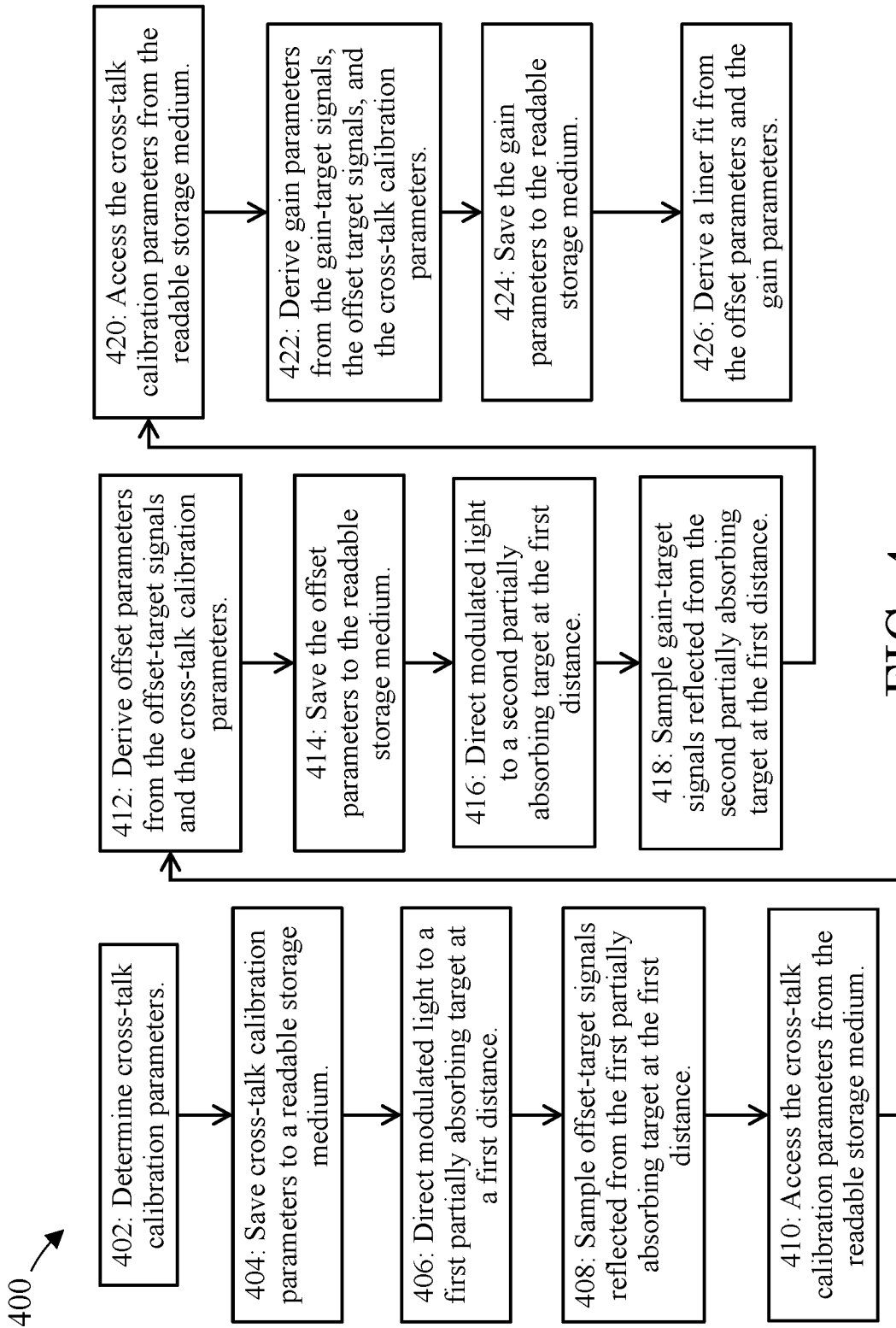
FIG. 4 depicts still another example method for calibrating optoelectronic modules operable to demodulate incident modulated light.

FIG. 4 depicts still another example method 400 for calibrating optoelectronic modules operable to demodulate incident modulated light. The calibration method 400 includes a step 402 of determining cross-talk calibration parameters, for example, according to the methods described above and illustrated in FIG. 2 and FIG. 3.

The calibration method 400 includes another step 404 of saving the cross-talk calibration parameters; such as the phase ($\phi$), amplitude (A), offset (B), and/or the optical power measurements (e.g., $A_0, A_1, A_2,$ and $A_3$); to a readable storage medium (e.g., computer memory).

The calibration method 400 includes another step 406 of directing the emitted modulated light 120 to a first partially absorbing target such as a white card (e.g., 90% reflective). The first partially absorbing target can be disposed at a first distance from the optoelectronic module 102, such as an intermittent distance with respect to the typical operating range of the optoelectronic module 102 (e.g., 100 mm-300 mm).

The calibration method 400 includes another step 408 of sampling offset-target signals reflected from the first partially absorbing target at the first distance. Offset-target signals, for example, include four optical power measurements $A_0, A_1, A_2,$ and $A_3$ as described above, sampled at four instances in time.

The calibration method 400 includes another step 410 of accessing the cross-talk calibration parameters; such as the phase ($\phi$), amplitude (A), offset (B), and/or the optical power measurements (e.g., $A_0, A_1, A_2,$ and $A_3$); from the readable storage medium (e.g., computer memory).

The calibration method 400 includes another step 412 of deriving offset parameters from the offset-target signals and the cross-talk calibration parameters. Offset parameters may be derived from: 1) the first distance to the first partially absorbing target, 2) the offset-target signals, and 3) the cross-talk calibration parameters.

The calibration method 400 includes another step 414 of saving the offset parameters such as the phase ($\phi$), amplitude (A), offset (B), and/or the optical power measurements (e.g., $A_0, A_1, A_2$, and $A_3$); to the readable storage medium (e.g., computer memory).

The calibration method 400 includes another step 416 of directing the emitted modulated light 120 to a second partially absorbing target such as a grey card (e.g., 50% reflective). The second partially absorbing target can be disposed at the first distance from the optoelectronic module 102, such as an intermittent distance with respect to the typical operating range of the optoelectronic module 102 (e.g., 100 mm-300 mm).

The calibration method 400 includes another step 418 of sampling gain-target signals reflected from the second partially absorbing target at the first distance. Gain-target signals, for example, include four optical power measurements $A_0, A_1, A_2$, and $A_3$ as described above, sampled at four instances in time.

The calibration method 400 includes another step 420 accessing the cross-talk calibration parameters; such as the phase ($\phi$), amplitude (A), offset (B), and/or the optical power measurements (e.g., $A_0, A_1, A_2$, and $A_3$); from the readable storage medium (e.g., computer memory).

The calibration method 400 includes another step 422 deriving gain parameters from the gain-target signals, the offset-target signals and the cross-talk calibration parameters. Gain-target parameters may be derived from: 1) the first distance to the first partially absorbing target, 2) the offset-target signals, 3) the gain-target signals, and 4) the cross-talk calibration parameters.

The calibration method 400 includes another step 424 of saving the gain parameters such as the phase ($\phi$), amplitude (A), offset (B), and/or the optical power measurements (e.g., $A_0, A_1, A_2$, and $A_3$); to the readable storage medium (e.g., computer memory).

The calibration method 400 includes another step 426 of deriving a linear fit from the offset parameters and the gain parameters. The linear fit can describe a linear relationship between measured and real distances. The gain parameters can delineate the slope of the linear fit, and the offset parameters can delineate the intercept of the linear fit. As the gain parameters and the offset parameters take into account the cross-talk parameters, accurate object distance can be determined.

Figure 5:
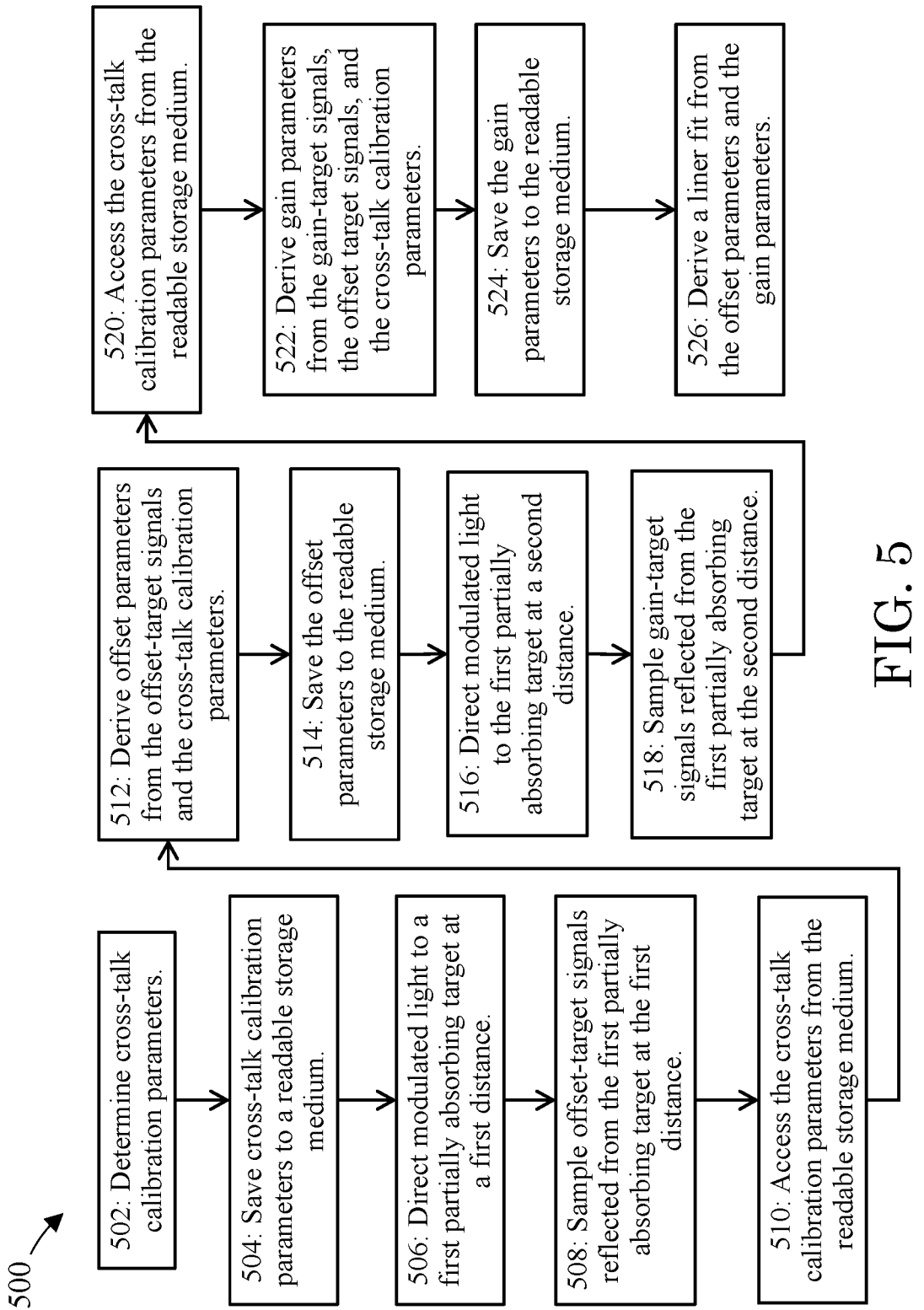
FIG. 5 depicts still yet another example method for calibrating optoelectronic modules operable to demodulate incident modulated light.

FIG. 5 depicts still yet another example method 500 for calibrating optoelectronic modules operable to demodulate incident modulated light. The calibration method 500 includes a step 502 of determining cross-talk calibration parameters, for example, according to the methods described above and illustrated in FIG. 2 and FIG. 3.

The calibration method 500 includes another step 504 saving the cross-talk calibration parameters; such as the phase ($\phi$), amplitude (A), offset (B), and/or the optical power measurements (e.g., $A_0, A_1, A_2$, and $A_3$); to a readable storage medium (e.g., computer memory).

The calibration method 500 includes another step 506 directing the emitted modulated light 120 to a first partially absorbing target such as a white card (e.g., 90% reflective). The first partially absorbing target can be disposed at a first distance from the optoelectronic module 102, such as an intermittent distance with respect to the typical operating range of the optoelectronic module 102 (e.g., 100 mm-300 mm).

The calibration method 500 includes another step 508 sampling offset-target signals reflected from the first partially absorbing target at the first distance. Offset-target signals, for example, include four optical power measurements $A_0, A_1, A_2$, and $A_3$ as described above, sampled at four instances in time.

The calibration method 500 includes another step 510 of accessing the cross-talk calibration parameters; such as the phase ($\phi$), amplitude (A), offset (B), and/or the optical power measurements (e.g., $A_0, A_1, A_2$, and $A_3$); from the readable storage medium (e.g., computer memory).

The calibration method 500 includes another step 512 of deriving offset parameters from the offset-target signals and the cross-talk calibration parameters. Offset parameters may be derived from: 1) the first distance to the first partially absorbing target, 2) the offset-target signals, and 3) the cross-talk calibration parameters.

The calibration method 500 includes another step 514 of saving the offset parameters such as the phase ($\phi$), amplitude (A), offset (B), and/or the optical power measurements (e.g., $A_0, A_1, A_2$, and $A_3$); to the readable storage medium (e.g., computer memory).

The calibration method 500 includes another step 516 directing the emitted modulated light 120 to a first partially absorbing target such as a white card (e.g., 90% reflective). The first partially absorbing target can be disposed at a second distance from the optoelectronic module 102, such as an intermittent distance with respect to the typical operating range of the optoelectronic module 102 (e.g., 300 mm-700 mm).

The calibration method 500 includes another step 518 sampling gain-target signals reflected from the first partially absorbing target at the first distance. Gain-target signals, for example, include four optical power measurements $A_0, A_1, A_2$, and $A_3$ as described above, sampled at four instances in time.

The calibration method 500 includes another step 520 accessing the cross-talk calibration parameters; such as the phase ($\phi$), amplitude (A), offset (B), and/or the optical power measurements (e.g., $A_0, A_1, A_2$, and $A_3$); from the readable storage medium (e.g., computer memory).

The calibration method 500 includes another step 522 deriving gain parameters from the gain-target signals, the offset-target signals and the cross-talk calibration parameters. Gain-target parameters may be derived from: 1) the first distance to the first partially absorbing target, 2) the second distance to the first partially absorbing target, 3) the offset-target signals, 4) the gain-target signals, and 5) the cross-talk calibration parameters.

The calibration method 500 includes another step 524 of saving the gain parameters such as the phase ($\phi$), amplitude (A), offset (B), and/or the optical power measurements (e.g., $A_0, A_1, A_2$, and $A_3$); to the readable storage medium (e.g., computer memory).

The calibration method 500 includes another step 526 of deriving a linear fit from the offset parameters and the gain parameters. The linear fit can describe a linear relationship between measured and real distances. The gain parameters can delineate the slope of the linear fit, and the offset parameters can delineate the intercept of the linear fit. As the gain parameters and the offset parameters take into account the cross-talk parameters, accurate object distance can be determined.

Figure 6:
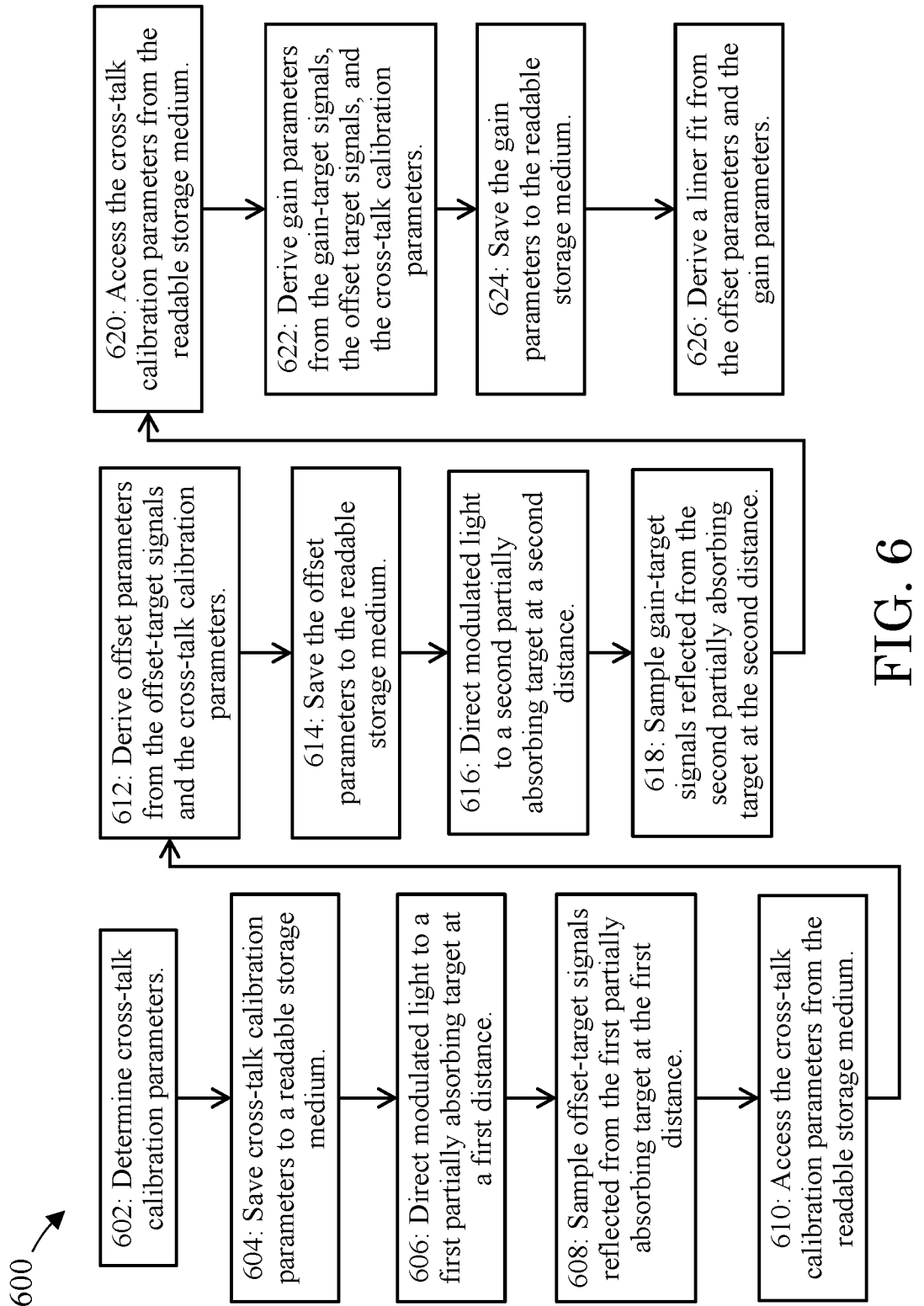
FIG. 6 depicts still yet another example method for calibrating optoelectronic modules operable to demodulate incident modulated light.

FIG. 6 depicts still yet another example method 600 for calibrating optoelectronic modules operable to demodulate incident modulated light. The calibration method 600 includes a step 602 of determining cross-talk calibration parameters, for example, according to the methods described above and illustrated in FIG. 2 and FIG. 3.

The calibration method 600 includes another step 604 saving the cross-talk calibration parameters; such as the phase (φ), amplitude (A), offset (B), and/or the optical power measurements (e.g., $A_0$, $A_1$, $A_2$, and $A_3$); to a readable storage medium (e.g., computer memory).

The calibration method 600 includes another step 606 directing the emitted modulated light 120 to a first partially absorbing target such as a white card (e.g., 90% reflective). The first partially absorbing target can be disposed at a first distance from the optoelectronic module 102, such as an intermittent distance with respect to the typical operating range of the optoelectronic module 102 (e.g., 100 mm-300 mm).

The calibration method 600 includes another step 608 sampling offset-target signals reflected from the first partially absorbing target at the first distance. Offset-target signals, for example, include four optical power measurements $A_0$, $A_1$, $A_2$, and $A_3$ as described above, sampled at four instances in time.

The calibration method 600 includes another step 610 accessing the cross-talk calibration parameters; such as the phase (φ), amplitude (A), offset (B), and/or the optical power measurements (e.g., $A_0$, $A_1$, $A_2$, and $A_3$); from the readable storage medium (e.g., computer memory).

The calibration method 600 includes another step 612 deriving offset parameters from the offset-target signals and the cross-talk calibration parameters. Offset parameters may be derived from: 1) the first distance to the first partially absorbing target, 2) the offset-target signals, and 3) the cross-talk calibration parameters.

The calibration method 600 includes another step 614 of saving the offset parameters such as the phase (φ), amplitude (A), offset (B), and/or the optical power measurements (e.g., $A_0$, $A_1$, $A_2$, and $A_3$); to the readable storage medium (e.g., computer memory).

The calibration method 600 includes another step 616 of directing the emitted modulated light 120 to a second partially absorbing target such as a grey card (e.g., 50% reflective). The first partially absorbing target can be disposed at a second distance from the optoelectronic module 102, such as an intermittent distance with respect to the typical operating range of the optoelectronic module 102 (e.g., 300 mm-700 mm).

The calibration method 600 includes another step 618 of sampling gain-target signals reflected from the second partially absorbing target at the second distance. Gain-target signals, for example, include four optical power measurements $A_0$, $A_1$, $A_2$, and $A_3$ as described above, sampled at four instances in time.

The calibration method 600 includes another step 620 of accessing the cross-talk calibration parameters; such as the phase (φ), amplitude (A), offset (B), and/or the optical power measurements (e.g., $A_0$, $A_1$, $A_2$, and $A_3$); from the readable storage medium (e.g., computer memory).

The calibration method 600 includes another step 622 of deriving gain parameters from the gain-target signals, the offset-target signals and the cross-talk calibration parameters. Gain-target parameters may be derived from: 1) the first distance to the first partially absorbing target, 2) the second distance to the second partially absorbing target, 3) the offset-target signals, 4) the gain-target signals, and 5) the cross-talk calibration parameters.

The calibration method 600 includes another step 624 of saving the gain parameters such as the phase (φ), amplitude (A), offset (B), and/or the optical power measurements (e.g., $A_0$, $A_1$, $A_2$, and $A_3$); to the readable storage medium (e.g., computer memory).

The calibration method 600 includes another step 626 of deriving a linear fit from the offset parameters and the gain parameters. The linear fit can describe a linear relationship between measured and real distances. The gain parameters can delineate the slope of the linear fit, and the offset parameters can delineate the intercept of the linear fit. As the gain parameters and the offset parameters take into account the cross-talk parameters, accurate object distance can be determined.

Figure 7:
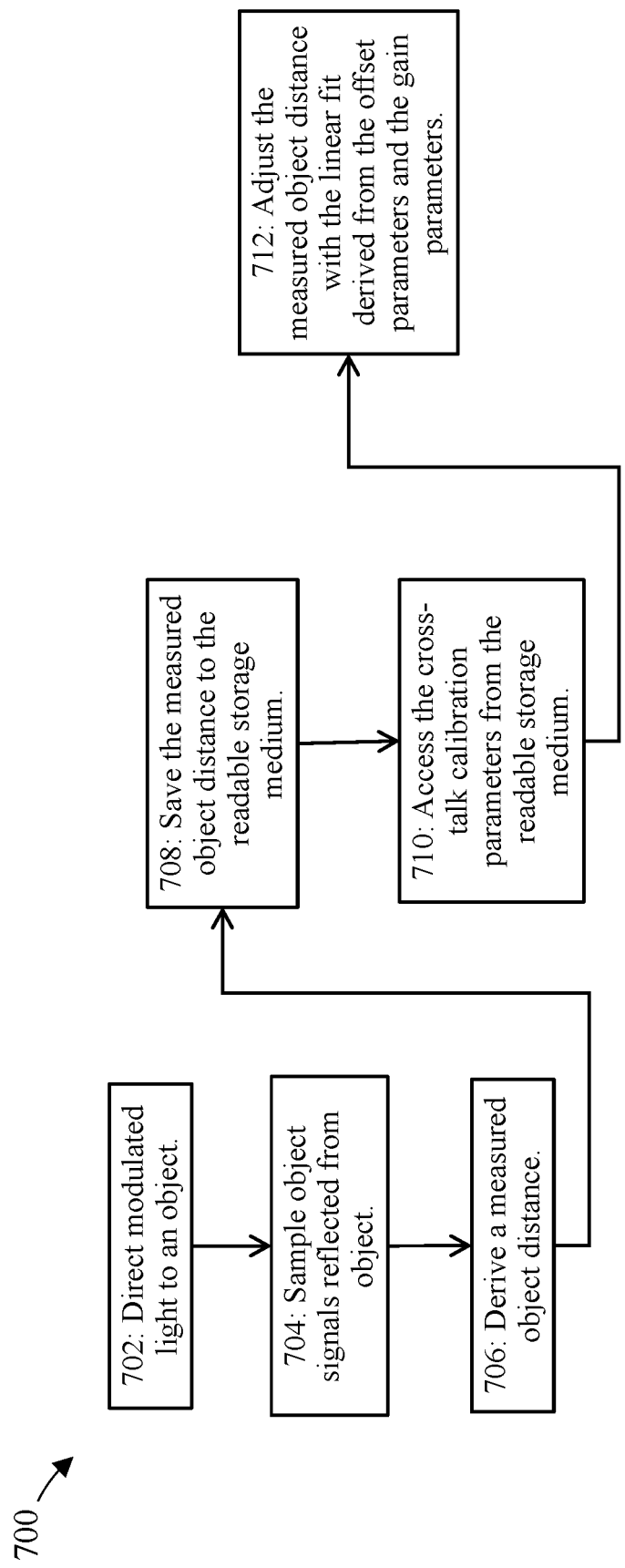
FIG. 7 depicts still yet another example method for calibrating optoelectronic modules operable to demodulate incident modulated light.

FIG. 7 depicts still yet another example method 700 for calibrating optoelectronic modules operable to demodulate incident modulated light. The calibration method 700 includes a step 702 of directing the emitted modulated light 120 to the object 122 or objects in a scene. The object 122 is at least partially reflective to the emitted modulated light 120. For example, the object 122 can reflect at least 5% of the emitted modulated light 120 such that sufficient light is reflected to the receiver 108 to generate a useable signal. The object can be disposed at any distance within the working range of the optoelectronic module 102. For example, the object 122 can be disposed at 100 mm or 2000 mm.

The calibration method 700 includes another step 704 of sampling object signals reflected from object 122. Object signals, for example, include four optical power measurements $A_0$, $A_1$, $A_2$, and $A_3$ as described above, sampled at four instances in time.

The calibration method 700 includes another step 706 deriving measured object distance parameters. For example, the four optical power measurements $A_0$, $A_1$, $A_2$, and $A_3$ referred to in step 704, can be used to derive the phase (φ) and amplitude (A) of the object signal, and a phasor can be constructed within a complex coordinate system as described above. Further, as described above, distance can be derived from the principles of the indirect time-of-flight technique. The measured object distance parameters, however, include a component due to cross-talk; accordingly, the derived distance is inaccurate.

The calibration method 700 includes another step 708 of saving the measured object distance parameters; such as the phase (φ), amplitude (A), offset (B), and/or the optical power measurements (e.g., $A_0$, $A_1$, $A_2$, and $A_3$); to the readable storage medium (e.g., computer memory).

The calibration method 700 includes another step 710 of accessing linear fit previously derived, for example, in the methods illustrated in FIG. 4, FIG. 5, and FIG. 6.

The calibration method 700 includes another step 712 of adjusting the measured object distance parameters with the linear fit. As the linear fit takes into account the gain parameters, the offset parameters, and the cross-talk parameters, accurate object distance can be determined.

Although the present invention has been described in detail with respect to various versions, other versions can include combinations of various disclosed features; therefore, the spirit and scope of the appended claims should not be limited to the description of the versions contained herein and are accordingly within the scope of the appended claims.

What is claimed is:

1. A calibration method, the method comprising:
   determining cross-talk calibration parameters for an optoelectronic module having an emitting channel and a receiving channel, the optoelectronic module being operable to demodulate modulated light incident on the receiving channel, wherein said determining comprises:
   directing modulated light from the emitting channel;
   sampling cross-talk-target signals generated in the receiving channel, wherein the cross-talk-target signals correspond to incident modulated light due to cross-talk between the emitting channel and the receiving channel, and wherein sampling cross-talk-target signals includes performing optical power measurements of the incident modulated light deriving the cross-talk calibration parameters from the cross-talk-target signals, wherein the cross-talk calibration parameters comprise one or more of: an amplitude of the cross-talk-target signal, a phase of the cross-talk-target signal, and/or a cross-talk-target signal offset, wherein the cross-talk-target signal offset corresponds to a total intensity of the cross-talk-target signal; and storing the cross-talk calibration parameters on a readable storage medium.

2. The calibration method of claim 1, wherein directing modulated light from the emitting channel comprises directing modulated light from the emitting channel to a substantially absorbing target, the substantially absorbing target having a reflectivity of 5% or less.

3. The calibration method as in claim 2, further comprising conveying instructions to a user of the optoelectronic module via software operable to receive the cross-talk calibration parameters from the readable storage medium, and operable to prompt the user to direct modulated light from the emitting channel to the substantially absorbing target.

4. The calibration method of claim 1, wherein determining the cross-talk calibration parameters further includes:
covering the receiving channel.

5. The calibration method of claim 1, the method further comprising:
directing modulated light from the emitting channel to an object;
sampling object signals generated in the receiving channel, wherein the object signals correspond to incident modulated light due to cross-talk between the emitting channel and receiving channel and due to modulated light reflected from the object, and wherein sampling object signals includes performing optical power measurements of the incident modulated light;
deriving measured object distance parameters from the object signals, wherein the measured object distance parameters comprise one or more of: an amplitude of the object signal, a phase of the object signal, and/or an object signal offset, wherein the object signal offset corresponds to a total intensity of the object signal; and
storing the measured object distance parameters on the readable storage medium.

6. The calibration method of claim 5, wherein the cross-talk calibration parameters include the phase and the amplitude of the cross-talk-target signal, and wherein the object distance parameters include the phase and the amplitude of the object signal, the method further comprising:
receiving the cross-talk calibration parameters from the readable storage medium;
constructing a cross-talk calibration phasor having a phase corresponding to the phase of the cross-talk-target signal and an amplitude corresponding to the amplitude of the cross-talk-target signal;
constructing an object distance phasor having a phase corresponding to the phase of the object signal and an amplitude corresponding to the amplitude of the object signal; and
subtracting the cross-talk calibration phasor from the object distance phasor.

7. The calibration method as in claim 5, further comprising conveying instructions to a user of the optoelectronic module via software operable to receive the cross-talk calibration parameters and object distance from the readable storage medium, and operable to prompt the user to direct modulated light from the emitting channel to the object.

8. The calibration method of claim 1, the method further comprising:
determining offset parameters by directing modulated light from the emitting channel to a first partially absorbing target, the first partially absorbing target having a reflectivity of at least 90% at a first distance;
wherein determining offset parameters further comprises:
sampling offset-target signals generated in the receiving channel, wherein the offset-target signals correspond to incident modulated light due to cross-talk between the emitting channel and the receiving channel and due to modulated light reflected from the first partially absorbing target at the first distance, and wherein sampling offset-target signals includes performing optical power measurements of the incident modulated light; and
deriving the offset parameters from the offset-target signals and the cross-talk calibration parameters, wherein the offset parameters comprise one or more of: an amplitude of the offset-target signal, a phase of the offset-target signal, and/or an offset-target signal offset, wherein the offset-target signal offset corresponds to a total intensity of the offset-target signal; and
wherein the method further comprises storing the offset parameters on the readable storage medium.

9. The calibration method of claim 8, the method further comprising:
determining gain parameters by directing modulated light from the emitting channel to a second partially absorbing target, the second partially absorbing target having a reflectivity of at least 50%, at the first distance;
wherein determining gain parameters further comprises:
sampling gain-target signals generated in the receiving channel, wherein the gain-target signals correspond to incident modulated light due to cross-talk between the emitting channel and the receiving channel and due to modulated light reflected from the second partially absorbing target at the first distance, and wherein sampling gain-target signals includes performing optical power measurements of the incident modulated light; and
deriving the gain parameters from the gain-target signals, the offset-target signals, and the cross-talk calibration parameters, wherein the gain parameters comprise one or more of: an amplitude of the gain-target signal, a phase of the gain-target signal, and/or a gain-target signal offset, wherein the gain-target signal offset corresponds to a total intensity of the gain-target signal; and
wherein the method further comprises storing the gain parameters on the readable storage medium.

10. The calibration method as in claim 9, in which the method further includes deriving a linear fit calibration from the offset parameters and gain parameters, the linear fit calibration comprising a slope and an intercept of a linear fit, wherein the gain parameters delineate the slope of the linear fit, and the offset parameters delineate the intercept of the linear fit.

11. The calibration method as in claim 9, further comprising conveying instructions to a user of the optoelectronic module via software operable to receive the cross-talk calibration parameters, the offset parameters, and the gain parameters from the readable storage medium; and operable to prompt the user to direct modulated light from the emitting channel to the second partially absorbing target.

12. The calibration method of claim 8, the method further comprising:
   determining gain parameters by directing modulated light from the emitting channel to the first partially absorbing target at a second distance; wherein determining gain parameters further comprises:
   sampling gain-target signals generated in the receiving channel, wherein the gain-target signals correspond to incident modulated light due to cross-talk between the emitting channel and the receiving channel and due to modulated light reflected from the first partially absorbing target at the second distance, and wherein sampling gain-target signals includes performing optical power measurements of the incident modulated light; and
   deriving the gain parameters from the gain-target signals, the offset-target signals, and the cross-talk calibration parameters, wherein the gain parameters comprise one or more of: an amplitude of the gain-target signal, a phase of the gain-target signal, and/or a gain-target signal offset, wherein the gain-target signal offset corresponds to a total intensity of the gain-target signal; and
   wherein the method further comprises storing the gain parameters on the readable storage medium.

13. The calibration method as in claim 12, further comprising conveying instructions to a user of the optoelectronic module via software operable to receive the cross-talk calibration parameters, the offset parameters, and the gain parameters from the readable storage medium; and operable to prompt the user to direct modulated light from the emitting channel to the first partially absorbing target.

14. The calibration method of claim 8, the method further comprising:
   determining gain parameters by directing modulated light from the emitting channel to a second partially absorbing target at a second distance, the second partially absorbing target having a reflectivity of at least 50%; wherein determining gain parameters further comprises:
   sampling gain-target signals generated in the receiving channel, wherein the gain-target signals correspond to incident modulated light due to cross-talk between the emitting channel and the receiving channel and due to modulated light reflected from the second partially absorbing target at the second distance, and wherein sampling gain-target signals includes performing optical power measurements of the incident modulated light; and
   deriving the gain parameters from the gain-target signals, the offset-target signals, and the cross-talk calibration parameters, wherein the gain parameters comprise one or more of:
   an amplitude of the gain-target signal, a phase of the gain-target signal, and/or a gain-target signal offset, wherein the gain-target signal offset corresponds to a total intensity of the gain-target signal; and
   wherein the method further comprises storing the gain parameters on the readable storage medium.

15. The calibration method as in claim 14, further comprising conveying instructions to a user of the optoelectronic module via software operable to receive the cross-talk calibration parameters, the offset parameters, and the gain parameters from the readable storage medium; and operable to prompt the user to direct modulated light from the emitting channel to the second partially absorbing target.

16. The calibration method as in claim 8, further comprising conveying instructions to a user of the optoelectronic module via software operable to receive the cross-talk calibration parameters and the offset parameters from the readable storage medium, and operable to prompt the user to direct modulated light from the emitting channel to the first partially absorbing target.

\* \* \* \* \*